United States Patent
Boutte

(10) Patent No.: US 11,047,419 B2
(45) Date of Patent: Jun. 29, 2021

(54) SEGMENTED DRIVESHAFT

(71) Applicant: Keith Boutte, Lafayette, LA (US)

(72) Inventor: Keith Boutte, Lafayette, LA (US)

( * ) Notice: Subject to any disclaimer, the term of this patent is extended or adjusted under 35 U.S.C. 154(b) by 305 days.

(21) Appl. No.: 15/899,563

(22) Filed: Feb. 20, 2018

(65) Prior Publication Data
US 2018/0238381 A1 Aug. 23, 2018

Related U.S. Application Data

(60) Provisional application No. 62/461,093, filed on Feb. 20, 2017.

(51) Int. Cl.
| | |
|---|---|
| *F16C 1/04* | (2006.01) |
| *F16D 3/226* | (2006.01) |
| *F16H 61/32* | (2006.01) |
| *F16H 59/02* | (2006.01) |
| *F16F 15/131* | (2006.01) |
| *F16D 3/68* | (2006.01) |
| *F16D 3/12* | (2006.01) |

(52) U.S. Cl.
CPC .............. *F16C 1/04* (2013.01); *F16D 3/2265* (2013.01); *F16H 59/0208* (2013.01); *F16H 61/32* (2013.01); *F16C 2326/06* (2013.01); *F16D 3/12* (2013.01); *F16D 3/68* (2013.01); *F16F 15/13107* (2013.01)

(58) Field of Classification Search
CPC .... F16C 1/04; F16C 2326/06; F16H 59/0208; F16H 61/32; F16D 3/2265; F16D 3/12; F16D 3/68; F16F 15/13107
USPC .................................................. 464/149, 157
See application file for complete search history.

(56) References Cited

U.S. PATENT DOCUMENTS

| | | | | |
|---|---|---|---|---|
| 1,739,756 A | * | 12/1929 | Granville .................. | F16C 1/04 464/149 |
| 2,883,839 A | | 4/1959 | Troeger et al. | |
| 3,013,447 A | | 12/1961 | Hils et al. | |
| 3,203,285 A | * | 8/1965 | Schmidt .................. | F16M 11/40 464/149 |
| 3,935,716 A | | 2/1976 | Symann | |

(Continued)

FOREIGN PATENT DOCUMENTS

| | | | |
|---|---|---|---|
| EP | 0297359 | 8/1992 | |
| GB | 15259 | * 8/1890 | .................... 464/149 |
| WO | 2010104758 | 9/2010 | |

OTHER PUBLICATIONS

Lee, Kevin, Two-Piece Driveshaft Technology, Hot Rod Network, Feb. 8, 2017.

*Primary Examiner* — Greg Binda

(57) ABSTRACT

A segmented driveshaft for transmission of torque and thrust loads from one member to another along an eccentric axis of rotation. The segmented driveshaft includes a plurality of pivotally interconnected vertebrae that is distributed along a connecting rod that is pivotally connected to a drivetrain assembly. The each vertebra has male and female interlocks that are pivotally mated with the male and female interlocks of an adjacent vertebra. Interposed between the adjacent vertebrae are independent male and female pivots that pivotally engage with each another. The pivotally mated interlocks of adjacent vertebrae and the pivotally engaged pivots allow the driveshaft to extend between connecting points of a drivetrain assembly that have offset axes of rotation.

17 Claims, 7 Drawing Sheets

(56) References Cited

U.S. PATENT DOCUMENTS

| | | | |
|---|---|---|---|
| 4,040,494 | A | 8/1977 | Kellner |
| 4,600,395 | A | 7/1986 | Pichl |
| 4,905,808 | A | 3/1990 | Tomita et al. |
| 5,176,575 | A | 1/1993 | McCullough |
| 5,613,914 | A | 3/1997 | Gleasman et al. |
| 5,617,926 | A | 4/1997 | Eddison et al. |
| 5,928,083 | A | 7/1999 | Monahan et al. |
| 6,158,529 | A | 12/2000 | Dorel |
| 6,610,007 | B2 | 8/2003 | Belson et al. |
| 8,707,498 | B2 | 4/2014 | Crawford et al. |
| 9,051,973 | B2 | 6/2015 | Nakagawa et al. |
| 2014/0360787 | A1 | 12/2014 | Williams et al. |
| 2016/0108970 | A1 | 4/2016 | Baudoin |

\* cited by examiner

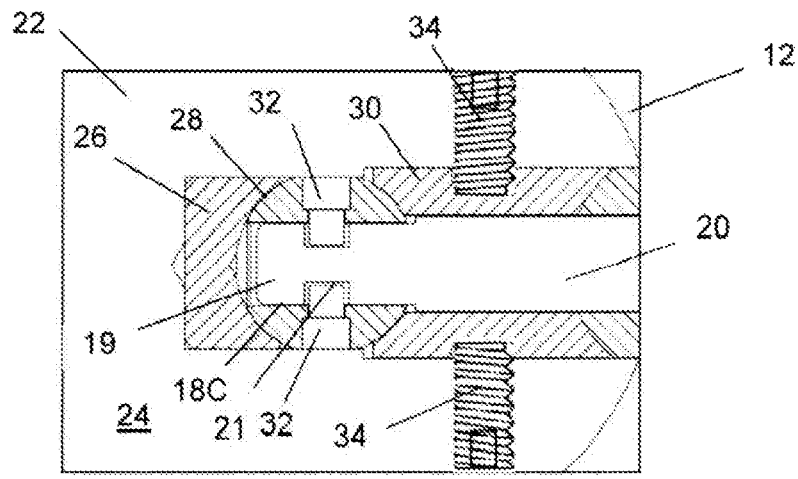
Fig. 14
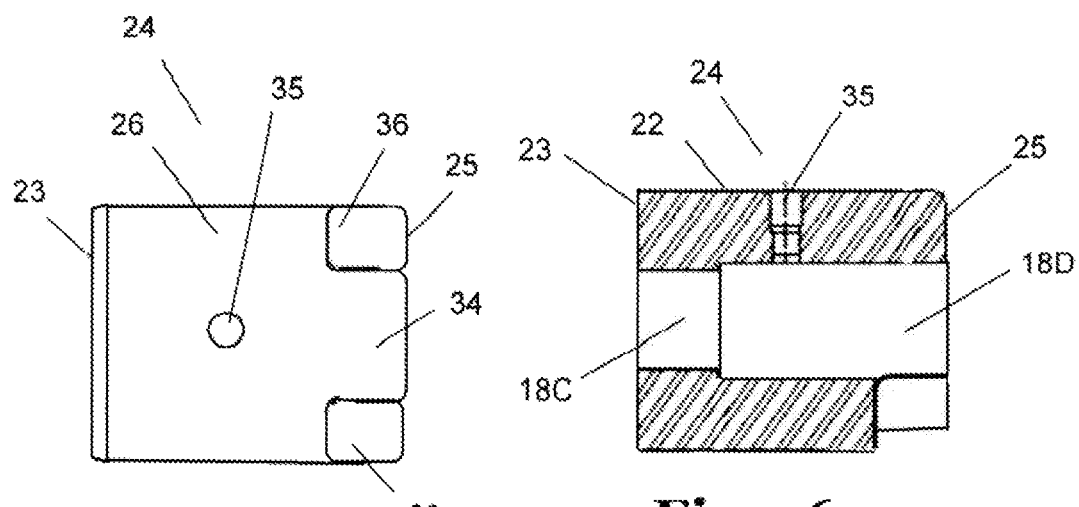
Fig. 15  Fig. 16

SEGMENTED DRIVESHAFT

PRIORITY

This application claims priority to U.S. provisional application entitled "Segmented Drive Shaft" bearing Ser. No. 62/461,093 filed Feb. 20, 2017, the entire content of which is hereby incorporated by reference.

FIELD OF THE INVENTION

This invention pertains to driveshaft assemblies. More particularly, it pertains to a segmented driveshaft comprised of multiple pivotally interconnected segments for transferring torque between misaligned connecting points.

BACKGROUND OF THE INVENTION

The driveshaft of a drivetrain assembly is a bar or rod utilized to transmit torque and rotation between first and second spaced-apart connecting points on the drivetrain assembly. When the first and second spaced-apart connecting points are offset or misaligned from each other, such as when the axis of driveshaft rotation is located elsewhere than at its geometric center of rotation, the driveshaft is often connected to a universal joint or a flexible coupling. The universal joints and flexible couplings are provided to compensate for the misalignment of the driveshaft connecting points in order to allow the driveshaft to transmit torque and rotation from the first spaced-apart connecting point to the second spaced-apart connecting point on five drivetrain assembly. However, when the first and second spaced-apart connecting points on the drivetrain assembly are offset, a bend is introduced in the intervening driveshaft as torque is transferred due to the eccentric rotation of the shaft. Such a bend will produce bending, torsional, and thrust stresses in the driveshaft during rotation that must be accommodated.

In some design situations, the overall diameter or width of the driveshaft can be increased to accommodate the stresses produced due to eccentric rotation. However, in many cases increasing the overall diameter or width of a drive-shaft subject to eccentric rotation may not be a feasible design option. Often the overall diameter or width of the driveshaft will be limited by space considerations in the device in which the driveshaft will be used and, accordingly, the torque that can be transmitted by such a driveshaft will also be limited. When such a driveshaft is over-torqued during use, a common occurrence, the thrust, bending and torsional stresses in the drivetrain assembly increase. The increase in the thrust, bending and torsional stresses will subject the driveshaft and the other components of the drivetrain assembly to unwanted vibration and breakdown.

Consequently, there is a need for an improved driveshaft in a drivetrain assembly capable of withstanding the thrust, bending and torsional stresses induced in the shaft by eccentric rotation.

There is also a need for an improved driveshaft that will allow for increased driveshaft rotation speeds and torque transmission in devices operated by a drivetrain assembly.

There is also a need for an improved driveshaft will allow for increased driveshaft rotation speeds and torque transmission in devices where driveshaft space is limited.

There is also a need for an improved driveshaft will reduce driveshaft vibration and the incidence of breakdown due to wear and tear on driveshaft and the drivetrain assembly.

SUMMARY OF THE INVENTION

The present invention provides a driveshaft designed to satisfy the aforementioned needs. The present invention provides a segmented driveshaft comprised of a plurality of pivotally connected vertebrae. The pivotally connected vertebrae absorb the stresses induced from eccentric torsional rotation of the driveshaft when its axis of rotation is located elsewhere than at its geometric center such as when the driveshaft is connected between connecting points that are offset from each other. The segmented driveshaft of the present invention will allow for increased rotational speeds and increased torque transmission between offset or unaligned first and second connecting points on a drivetrain assembly. The segmented driveshaft of the present invention will also reduce the incidence of damage to the driveshaft and the drivetrain assembly caused by high torque, speed, and/or thrust from eccentric driveshaft rotation.

It is thought that the segmented driveshaft of the present invention will be comprised of at least three or more pivotally interconnected driveshaft vertebrae and that the segmented driveshaft will extend between two misaligned connecting points of a drivetrain assembly. A driveshaft having such pivotally interconnected driveshaft vertebrae provides a smooth transmission of eccentric torsional and/or thrust movement between each of the interconnected driveshaft vertebrae and essentially eliminates the effects of the stresses caused by the misaligned connecting points. The smooth transmission of eccentric torsional and/or thrust movement allows the segmented driveshaft of the present invention to provide a smooth power transfer between the misaligned driveshaft connecting points and greatly diminish wear and damage to the driveshaft and the drivetrain components and thus increases their life.

The interconnected vertebrae of the segmented driveshaft of the present invention have an internal central bore and corresponding male and female pivotable interlocks. The segmented driveshaft also is provided with internal central pivots, also having a central bore, positioned within a counterbore at each end of each of the interconnected vertebrae to father allow pivotal movement between the corresponding male and female interlocks of adjacent vertebrae along the segmented driveshaft.

The adjacent vertebrae of the segmented driveshaft are held together by pivotally mating their corresponding male and female interlocks and a connecting rod inserted through the internal bore of the interconnected vertebrae and the internal central pivots. The connecting rod allows for easy assembly of the driveshaft components, pivotally secures the vertebrae and the internal central pivots together, and allows relative rotation of adjacent vertebrae and up and down and left and right pivotal movement at the central internal pivots and the male and female interlocks. The connecting rod also provides a means for pivotally securing the connecting ends of the driveshaft to connecting points and other components of a driveshaft assembly.

The interconnected vertebrae are designed so that the segmented driveshaft cannot be assembled properly unless the male and female interlocks of the adjacent vertebrae are correctly interconnected and aligned. Interlocking the central internal pivots within the bore of the interconnected vertebrae with the connecting rod creates a flexible driveshaft that provides stability, controlled eccentricity, and thrust absorption for a smooth transfer of eccentric rotation along the length of the driveshaft.

The interconnect vertebrae of the segmented driveshaft can be scaled in size, length and torsional power to provide a driveshaft that may be utilized in a variety of different equipment that requires a smooth torsional transition of power by a driveshaft between points of rotation that have an axis located elsewhere than at the geometric center of rotation of the driveshaft.

Such equipment includes but is not limited to equipment for the oil and gas energy industry, such as rig equipment, mud motors and rotary steerable tools, equipment for the transportation industry, such as heavy hauling trucks, cement trucks, and tow trucks, and equipment for the construction industry, such as backhoes, skid steers, bulldozers, and excavators. Equipment used in other industries will also benefit from the proposed driveshaft design including, marine equipment, farm equipment, loading equipment, such as forklifts, cranes, and conveyers, automotive equipment, aid equipment used in the mining industry, such as dump trucks, draglines, and raining shovels.

BRIEF DESCRIPTION OF DRAWINGS

FIG. 14 is a schematic longitudinal cross-section view of the terminal vertebra assembly of the segmented driveshaft shown in FIG. 3.

FIG. 15 is a longitudinal side view of an embodiment of the housing of the terminal vertebra assembly shown in FIG. 14.

FIG. 16 is a longitudinal side cross-section view of the housing of the terminal vertebra assembly shown in FIG. 15.

DESCRIPTION OF THE EMBODIMENTS

Figure 1:
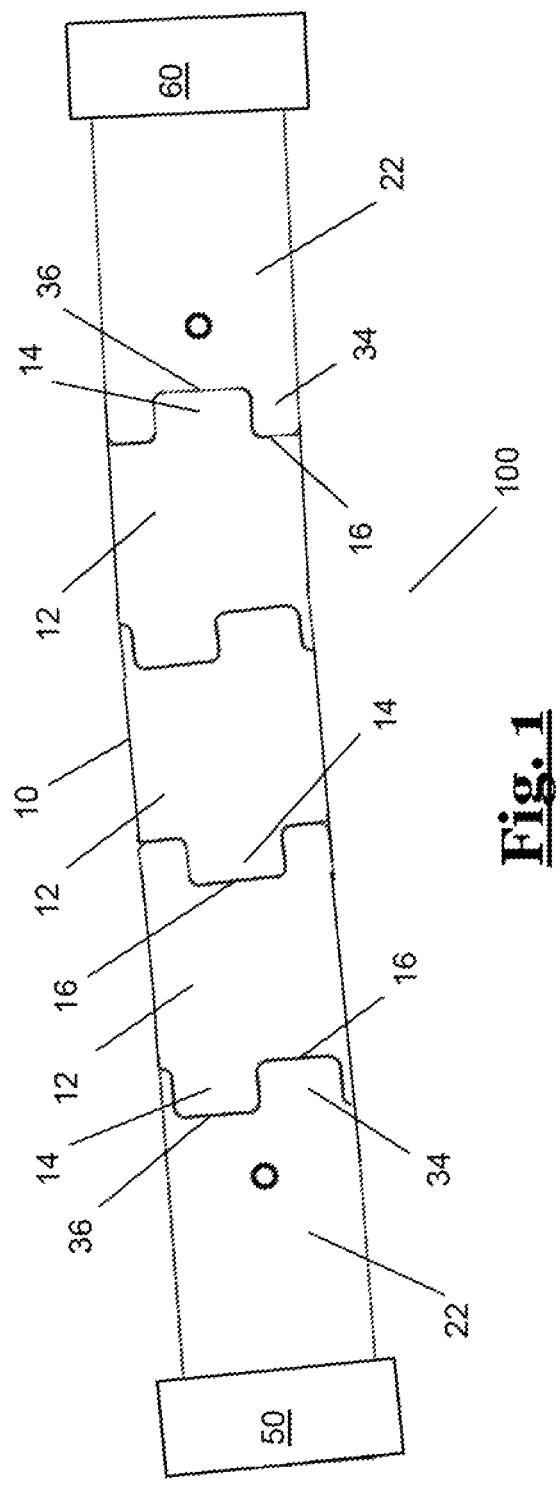
FIG. 1 is a longitudinal side view of the segmented driveshaft described herein.

FIG. 1 shows an embodiment of the segmented driveshaft (10). Driveshaft (10) is comprised of a plurality of pivotally interconnected vertebrae (12) that are arrayed between a first and a second terminal assembly (22) that are attached, respectively, at a first driveshaft connecting point (50) and a second driveshaft connecting point (60) of a drivetrain assembly (100). First driveshaft connecting point (50) and second driveshaft connecting point (60) will typically be spaced-apart driveshaft connecting points on drivetrain assembly (100) that are offset or misaligned from each other. Such offset or misaligned spaced-apart driveshaft connecting points occur when the axis of rotation of a driveshaft is located elsewhere than at its geometric center.

Figure 2:
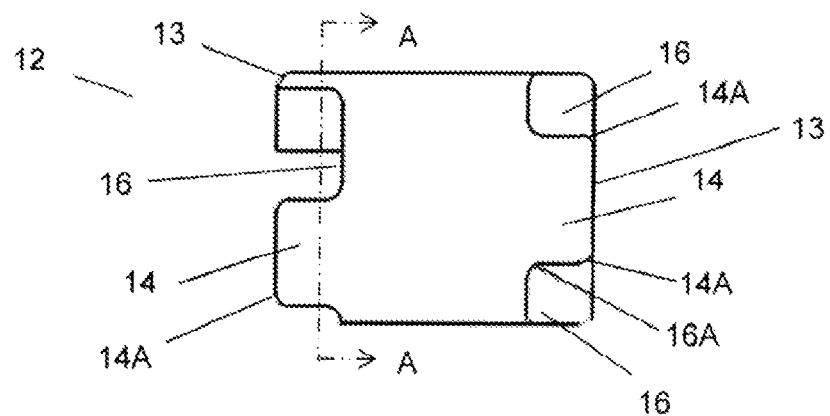
FIG. 2 is a longitudinal side view of a vertebra of the segmented driveshaft shown in FIG. 1.
Figure 4:
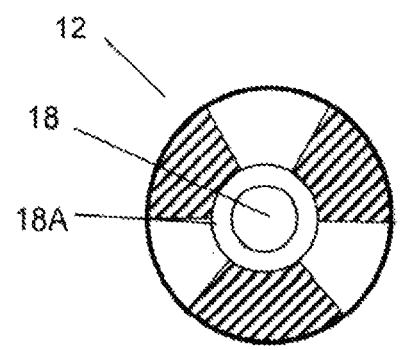
FIG. 4 is a transverse cross-section view of the vertebra of the segmented driveshaft cut along section line A-A as shown in FIG. 2.
Figure 3:
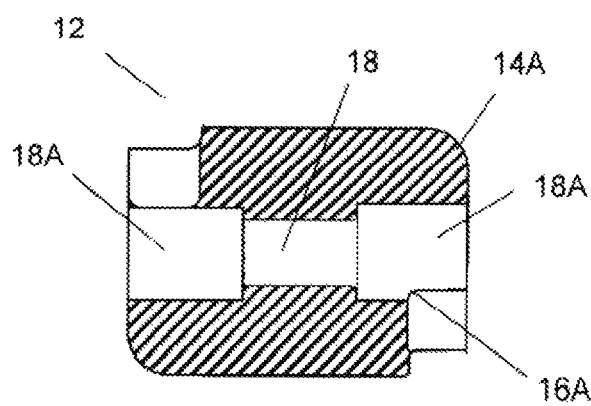
FIG. 3 is a longitudinal side cross-section view of the vertebra of the segmented driveshaft shown in FIG. 2.

FIGS. 2-4 show a longitudinal side view, a longitudinal side cross-section view, and a transverse cross-section view of an embodiment of a vertebra (12) of the segmented driveshaft (10). As shown in FIGS. 2-4, each vertebra (12) will be cylindrical in shape and have terminal ends (13). A central through-bore (18) extends through each vertebra (12) and a central counterbore (18A) extends around through-bore (18) inward from each end (13) of the vertebra (12). The ends (13) of each vertebra (12) have plurality of corresponding male interlocks (14) and female interlocks (16). Each male interlock (14) has a curved exterior pivot surface (14A) that is sized to correspond with a curved interior pivot surface (16A) on the female interlock (16). The male interlocks (14) and female interlocks (16) are spaced radially around the periphery of vertebra (12) and are positioned to mate and pivotally interlock with respective opposing male interlocks (14) or female interlocks (16) of an adjacent vertebra (12).

Figure 5:
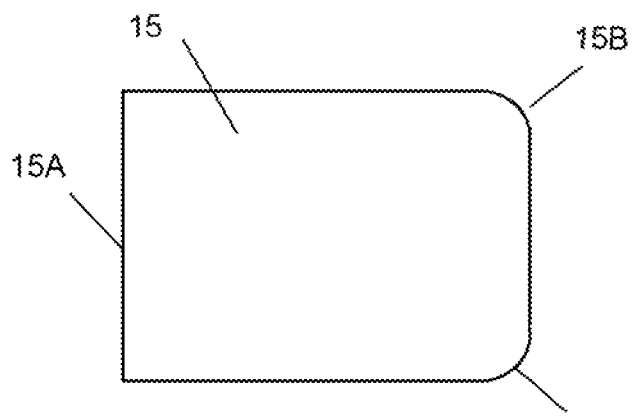
FIG. 5 is a longitudinal side view of a male internal central-pivot of the segmented driveshaft shown in FIG. 1.
Figure 6:
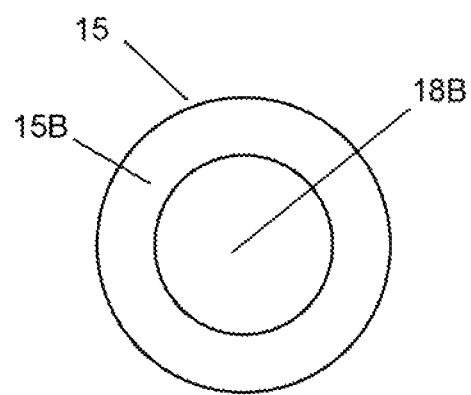
FIG. 6 is a longitudinal side cross-section view of the male internal central-pivot shown in FIG. 5.
Figure 7:
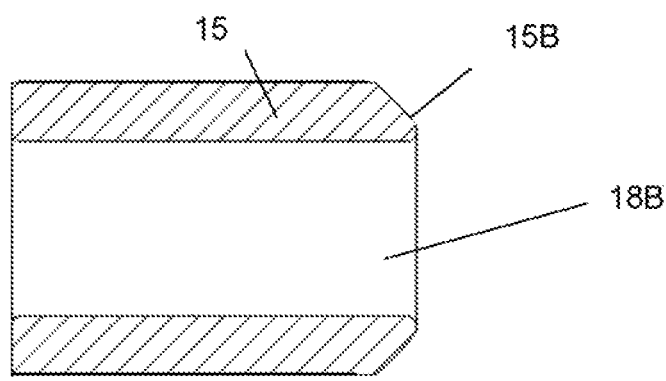
FIG. 7 is an end view of the male internal central-pivot shown in FIG. 5 showing its convexly-curved pivot surface.
Figure 8:
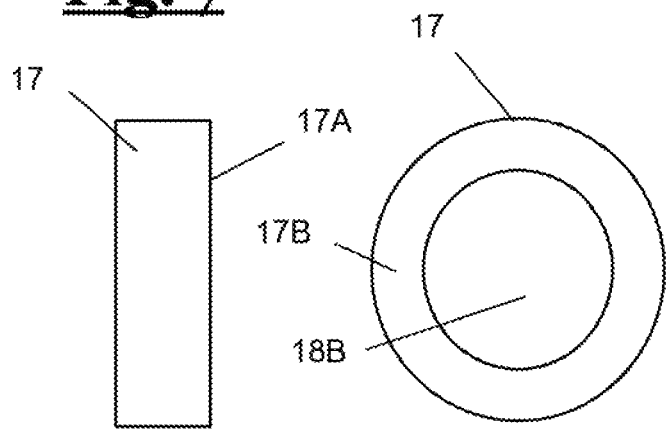
FIG. 8 is a longitudinal side view of a female internal central-pivot of the segmented driveshaft shown in FIG. 1.
Figure 9:
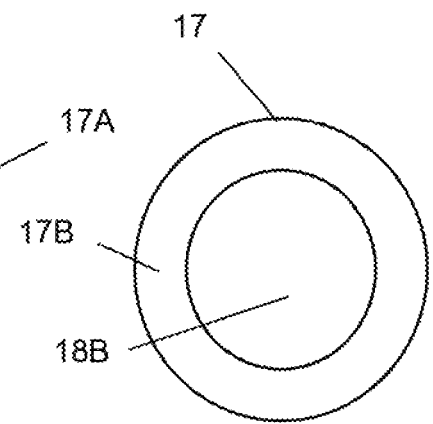
FIG. 9 is an end view of the female internal-central-pivot shown in FIG. 8 showing its concavely-curved pivot surface.
Figure 10:
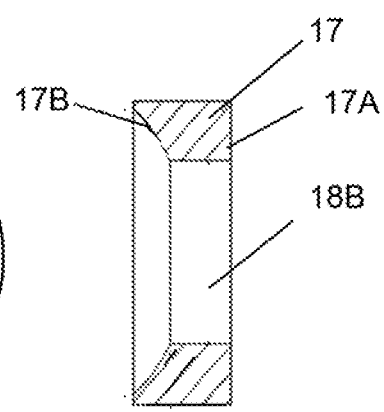
FIG. 10 is a longitudinal side cross-section view of the female internal central-pivot shown in FIG. 8.

The segmented driveshaft (10) is further comprised of a plurality of tubular male internal-central-pivots (15) that pivotally correspond with an adjoining tubular female internal-central-pivot (17). FIGS. 5 and 6, respectively, show a longitudinal side view and a longitudinal side cross-section view of an embodiment of a male internal-central-pivot (15). Each male internal-central-pivot (15) has a flat surface (15A) at one end and, as shown in FIGS. 5 and 7, a convexly-curved pivot surface (15B) at the opposite end. FIGS. 8 and 10, respectively, show a longitudinal side view and a longitudinal side cross-section view of an embodiment of the tubular female internal-central-pivot (17). Each female internal-central-pivot (17) has a flat surface (17A) at one end and, as shown in FIGS. 9 and 10, a concavely-curved pivot surface (17B) at the other end. Each male internal-central-pivot (15) and each female internal-central-pivot (17) has a central through-bore (18B).

The concavely-curved pivot surface (17B) of each female central-pivot (17) corresponds with the convexly-curved pivot surface (15B) on each male internal-central-pivot (15). The tubular male internal-central pivots (15) and the tubular female internal-central-pivots (17) are sized to be pivotally retained within the counterbores (18A) of adjacent vertebra (12) with through-bores (18B) of adjoining male internal-central-pivots (15) and female internal-central-pivots (17) aligned with the central through-bores (18) of adjoining vertebrae (12) as shown in FIG. 11.

Figure 11:
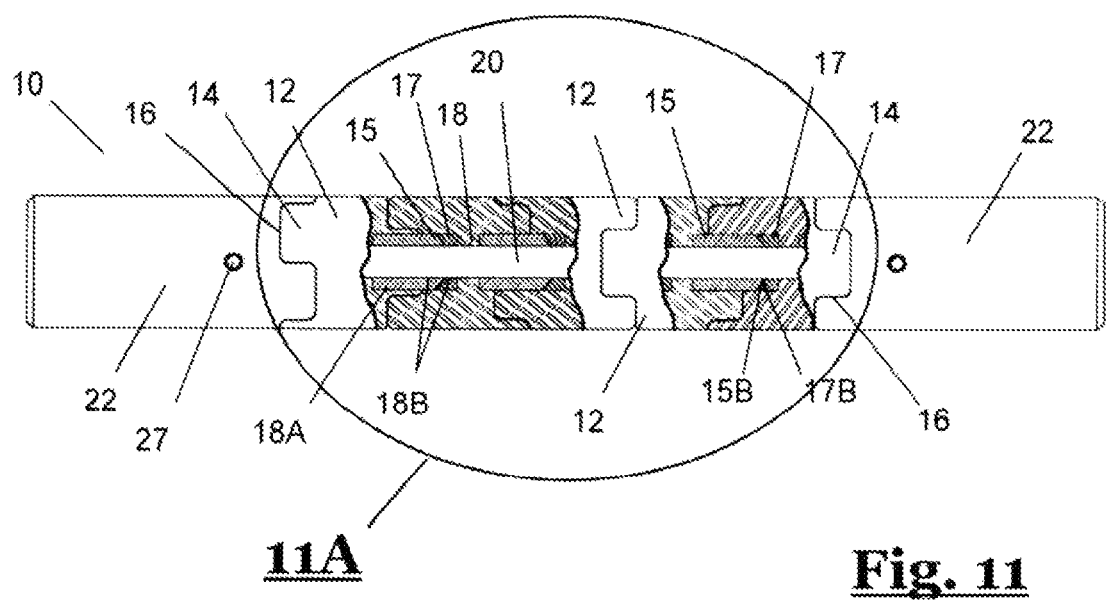
FIG. 11 is a longitudinal side partial cross-section view of the segmented driveshaft shown in FIG. 1.
Figure 11A:
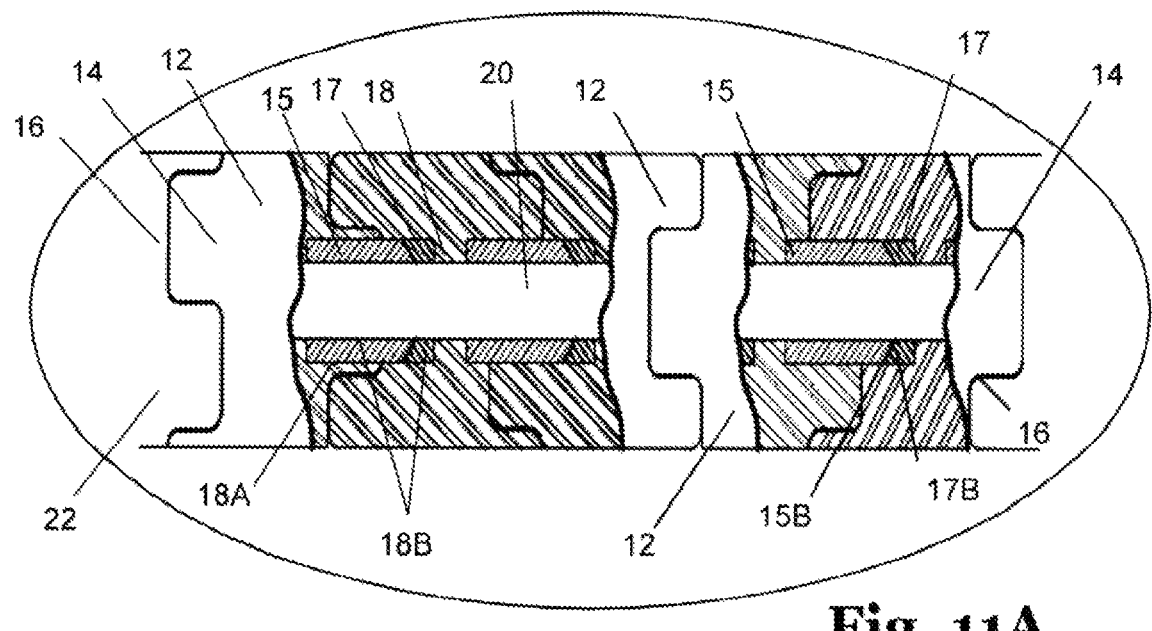
FIG. 11A is an enlarged cross-section view of a portion of the segmented driveshaft designated as 11A in FIG. 11.

FIGS. 11 and 11A show longitudinal side cross-section views of the segmented driveshaft (10) when assembled. In the embodiment shown, pivotally mated adjacent vertebrae (12) arrayed longitudinally along connecting rod (20) between terminal vertebra assemblies (22). The adjacent vertebrae (12) are interposed by a male internal-central-pivot (15) that is pivotally mated with a female internal-central-pivot (17). Connecting rod (20) extends through the central through-bore (18) of each vertebra (12) and the central through-bore (18B) of each male internal-central-pivot (15) and each female internal-central-pivot (17). When assembled a male internal-central-pivot (15) is pivotally mated with female internal-central-pivot (17) within the counterbores (18A) of adjacent vertebrae (12) and the male interlocks (14) and corresponding female interlocks (16) of the adjacent vertebrae (12) are mated and pivotally interlocked. A terminal vertebra assembly (22) may then be fitted to each terminal end section (19) of the connecting rod (20). It is expected that the segmented driveshaft (10) will be assembled with at least three or more pivotally interconnected adjacent vertebrae (12) though two pivotally interconnected adjacent vertebrae (12) may be sufficient in some situations.

Figure 12:
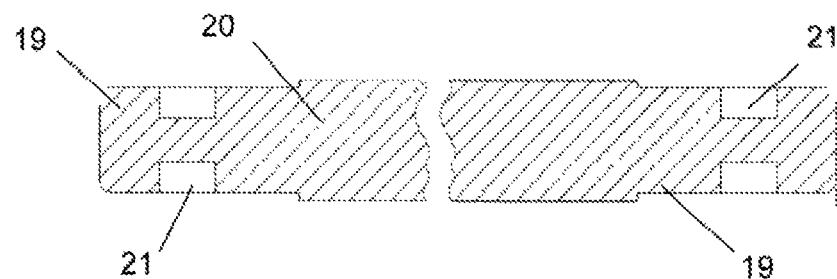
FIG. 12 is a longitudinal side cross-section view of the connecting rod of the segmented driveshaft shown in FIG. 1.
Figure 13:
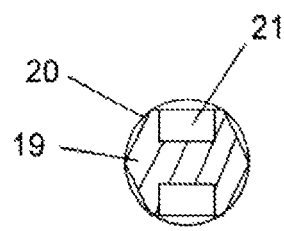
FIG. 13 is a transverse cross-section view of the connecting rod of the segmented driveshaft shown in FIG. 1.

FIGS. 12 and 13, respectively, show a longitudinal side cross-section view and a transverse cross-sectional view of the embodiment of the connecting rod (20) shown in FIG. 11. The connecting rod (20) shown is cylindrical in shape with hexagonal-shaped terminal end sections (19). The terminal end sections (19) of the connecting rod (20) have pin detents (21) for receiving a pin for securing connecting rod (20) to the terminal vertebra assembly (22). It is thought that the connecting rod (20) will be a rigid rod or bar, however a flexible cable such as a wire-rope cable having terminal sections similar to terminal end sections (19) may also be utilized as the connecting rod (20).

FIG. 14 is a schematic longitudinal side cross-section view of an embodiment of the terminal vertebra assembly (22). Each terminal vertebra assembly (22) is comprised of a terminal vertebra assembly housing (24), pivot nut seat (26), pivot nut (28), pivot nut washer (30). A pivot nut pin (32) positioned in pin detents (21) in the terminal end section (19) of connecting rod (20) connects the pivot nut (28) to the connection rod (20). Pivot nut set-screws (34) attach the pivot nut washer (30) to the terminal vertebra assembly housing (24).

FIGS. 15 and 16, respectively, show a longitudinal side and a longitudinal cross-section view of an embodiment of the terminal vertebra assembly housing (24). The terminal vertebra assembly-housing (24) has a terminal end (23) and an interlock end (25). The interlock end (25) of the terminal vertebra assembly housing (24) has a plurality of male interlocks (34) and female interlocks (36) that match and pivotally correspond with the male interlocks (14) and female interlocks (16) of a vertebra (12). As shown in FIG. 36, a central through-bore (18C) extends through terminal vertebra assembly housing (24) and a central counterbore (18D) extends inward from interlock end (25) around the central through-bore 18(C). Set-screw bores (35) are provided to receive a set-screw (34) as shown in FIG. 14.

Figure 17:
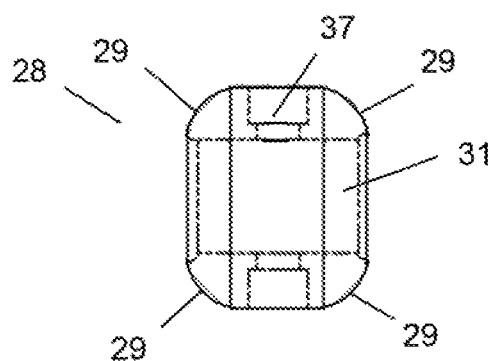
FIG. 17 is a top view of an embodiment of the pivot nut of the terminal vertebra assembly shown in FIG. 14.
Figure 19:
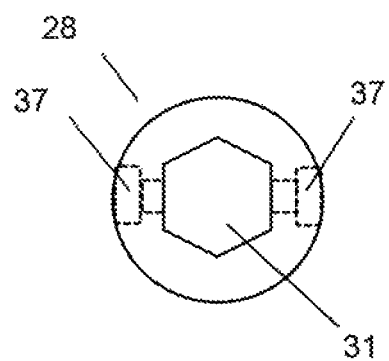
FIG. 19 is an end view of the pivot nut shown in FIG. 17.
Figure 18:
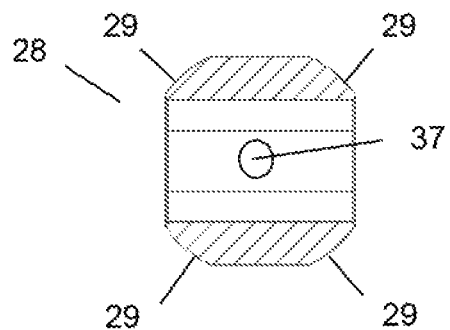
FIG. 18 is a longitudinal side cross-section view of the pivot not shown in FIG. 17.

FIGS. 17, 18 and 19, respectively, show a top view, a longitudinal side cross-section view, and an end view of an embodiment of pivot nut (28) of terminal vertebra assembly (22) shown in FIG. 14. Pivot nut (28) has external circular convexly-curved pivot surfaces (29) and a hexagonal bore (31) that extends through pivot nut (28) and that correspond with the hexagonal-shaped terminal end sections (19) of connecting rod (20). Pivot nut (28) also has pin bores (37) for receiving pivot nut pins (32) that correspond to and connect with detents (21) of the connecting rod (20).

Figure 20:
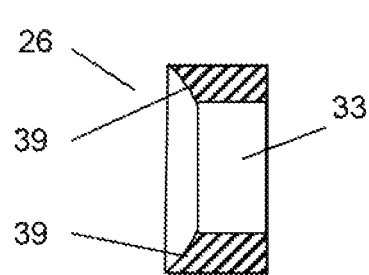
FIG. 20 is a longitudinal side cross-section view of the pivot nut of the terminal vertebra assembly shown in FIG. 14.

FIG. 20 is a longitudinal side cross-section view of the pivot nut seat (26) for the pivot nut (28) of the terminal vertebra assembly (22) shown in FIG. 14. Pivot nut seat (26) has concavely-curved pivot surfaces (39) that correspond with the convexly-curved pivot surfaces (29) on pivot nut (28) and the convexly-curved pivot surface (15B) on the male internal-central-pivots (15). A central through-bore (33) extends through pivot nut seat (26) and corresponds with central through-bore (18) of each vertebra (12).

Figure 21:
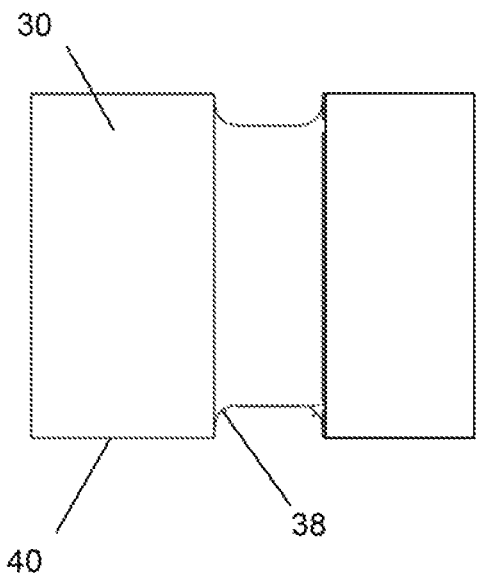
FIG. 21 is a longitudinal side view of an embodiment of the pivot nut washer of the terminal vertebra assembly shown in FIG. 14.
Figure 22:
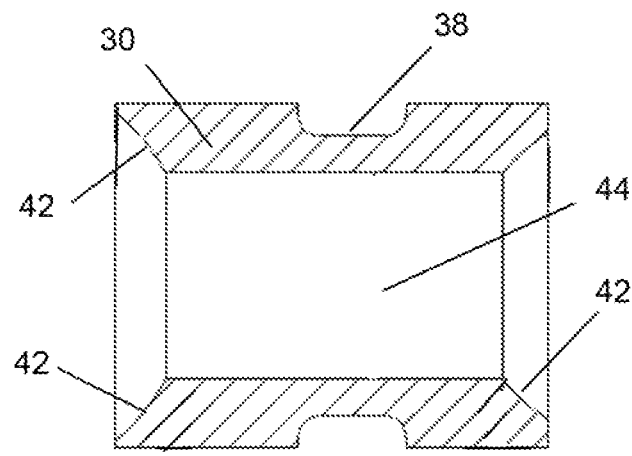
FIG. 22 is a longitudinal side cross-section view of pivot washer shown in FIG. 21.

FIGS. 21 and 22, respectively, show a longitudinal side view and a longitudinal side cross-section view of an embodiment of pivot nut washer (30) of the terminal vertebra assembly (22) shown in FIG. 14. Pivot nut washer (30) is cylindrically shaped and has centrally located radial recess (38) around its perimeter (40). Central through-bore (44) extends through pivot nut washer (30) to correspond and align with the central bore (18) of each vertebra (32). Pivot nut washer (30) has concavely-curved pivot surfaces (42) to pivotally correspond with the convexly-curved pivot surfaces (29) on pivot nut (28) and the convexly-curved pivot surface (15B) on the male internal-central-pivots (15). The radial recess (38) is sized and located to correspond with set-screw bores (35) of terminal vertebra assembly housing (24) to receive set-screws (34) for attachment to the terminal vertebra assembly housing (24) as shown in FIG. 14.

The segmented driveshaft (10) is assembled as shown in FIG. 11 by inserting the connecting rod (20) through the central through-bore (18) of a desired plurality of adjacent vertebrae (12) and through the central through-bores (18B) of a male internal-central-pivot (15) and a corresponding female internal-central-pivot (17) that are nested within the counterbores (18A) of the adjacent vertebrae (12). When so nested, the convexly-curved pivot surface (15B) on the male internal-central-pivot (15) pivotally engages with the concavely-curved pivot surface (17B) of the female internal-central-pivot (17). The adjacent vertebrae (12) may be turned or rotated on the connecting rod (20) so that male interlocks (14) of the adjacent vertebrae (12) are mated and pivotally interlocked with a female interlock (16).

When the desired plurality of vertebrae (12) is inserted on the connecting rod (20), the segmented driveshaft (10) may be completed by attaching a terminal vertebra assembly (22) to the terminal end sections (19) of the connecting rod (20) as shown in FIG. 14. A terminal vertebra assembly (22) is attached to the connecting rod (20) by inserting a terminal end section (19) of the connecting rod (20) through the central bore (44) of a pivot nut washer (30) so that concavely-curved pivot surfaces (42) on the pivot nut washer (30) correspond with convexly-curved male pivot surface (15A) of an adjacent male internal-central pivot (15) previously inserted onto the connecting rod (20).

The terminal end section (19) of the connecting rod (20) is then inserted into the hexagonal bore (31) of a pivot nut (28) and the pivot nut (28) is then secured to the terminal end section (19) with pivot pins (32) placed into pin bores (37). A pivot nut seat (26) is then placed into the counterbore (18D) of the terminal vertebra assembly housing (24) with its concavely-curved pivot surfaces 39 extending outward. The pivot nut (28) with the attached connecting rod (20) is then inserted into the counterbore (18D) of the terminal vertebra assembly housing (24) to pivotally engage its convexly-curved pivot surfaces (29) with the concavely-curved pivot surfaces (39) of the pivot nut seat (26).

Set-screws (34) are then inserted into set-screw bores (35) of the terminal vertebra assembly housing (24) to secure the connecting rod (20) to the terminal vertebra assembly housing (24) and the terminal assembly (22). When the terminal vertebra assembly (22) is properly assembled and attached to the terminal end section (19) of the connecting rod (20), the male interlocks (34) and female interlocks (36) of the vertebra housing (24) will pivotally mate with corresponding respective female interlocks (16) and male interlocks (14) of the adjacent vertebra (12) as shown in FIG. 14.

When the segmented driveshaft is properly assembled, the pivotal movement of the adjoining vertebrae (12) at the corresponding male internal-central-pivots (15) and female internal-central-pivots (17) and the corresponding male interlocks (14) and female interlocks (16) along the length of the segmented driveshaft (10) will allow the segmented driveshaft (10) to be eccentrically located between a connecting point (50) and an offset connecting point (60) of drivetrain assembly (100) as shown in FIG. 1. The pivotal movement between each interconnected vertebra (12) of the segmented driveshaft (10) provides a smooth power transfer when connecting point (50) and connecting point (60) are misaligned by the incremental relative displacement of the adjacent vertebrae (12) during eccentric torsional and/or thrust movement of the segmented driveshaft (10). The incremental relative displacement between the adjacent vertebrae (12) essentially eliminates the effects caused by the misalignment of connecting point (50) and connecting point (60).

Changes may be made in the form, construction and arrangement of the parts of the segmented driveshaft described herein without departing from the spirit and scope of the invention or sacrificing any of the invention's material advantages. The description and drawings provide only exemplary embodiments of the segmented driveshaft (10) and the invention can be practiced by other than the described embodiments, which are presented only for illustration and not limitation.

I claim:

1. A driveshaft comprising:
   (a) a connecting rod; and
   (b) a plurality of pivotally mated adjacent vertebrae each having a central through-bore through which said connecting rod extends whereby said plurality of adjacent vertebrae are arrayed longitudinally along said connecting rod, each of said adjacent vertebrae having male interlocks and female interlocks extending around the periphery of said adjacent vertebrae whereby said plurality of adjacent vertebrae are pivotally mated, each of said vertebrae having a counterbore around said central through-bore inward from each of its ends; and
   (c) a tubular female internal-central-pivot having a central bore through which said connecting rod extends, said tubular female internal-central-pivot pivotally corresponding with a tubular male internal-central-pivot retained within said counterbore around said central through-bore of said adjoining vertebrae.

2. The driveshaft recited in claim 1 wherein said connecting rod is pivotally connected between a first terminal vertebra and a second terminal vertebra.

3. The driveshaft recited in claim 2 wherein said first terminal vertebra and said second terminal vertebra connect to a drivetrain assembly.

4. The driveshaft recited in claim 3 wherein said drivetrain assembly has offset axes of rotation.

5. The driveshaft recited in claim 4 wherein each said male interlock has a curved exterior pivot surface sized to correspond with a curved interior pivot surface on each said female interlock.

6. The driveshaft recited in claim 5 wherein:
   (a) each said male internal-central-pivot has a flat surface at one end and a convexly-curved pivot surface at its opposite end and each said female internal-central-pivot has a flat surface at one end and a concavely-curved pivot surface at its opposite end that corresponds with said convexly-curved pivot surface of said male internal-central-pivot; and
   (b) wherein each said male internal-central-pivot pivot and each said corresponding female internal-central-pivot pivot are pivotally interposed between adjacent vertebrae of said plurality of pivotally mated vertebrae.

7. A driveshaft comprising:
   (a) a longitudinally extending connecting rod;
   (b) a plurality of adjacent vertebrae, each of said adjacent vertebrae having a central through-bore and a counterbore around said central through-bore inward from each of its ends, said connecting rod extending through said central through-bore of each of said adjacent vertebrae whereby said plurality of adjacent vertebrae are arrayed longitudinally along said connecting rod, each of said adjacent vertebrae having male interlocks and female interlocks;
   (c) a plurality of tubular male pivots, each said male pivot corresponding with an adjoining tubular female pivot, each said male pivot and each said corresponding female pivot having a central through-bore, said connecting rod extending through said central through-bore of each said male pivot and each said corresponding adjoining female pivot, each said male pivot with said corresponding adjoining female pivot pivotally interposed between adjacent vertebrae of said plurality of adjacent vertebrae within said counterbore at said ends of said adjacent vertebrae; and
   (d) wherein said male interlocks and said female interlocks of said adjacent vertebrae are pivotally mated.

8. The driveshaft recited in claim 7 wherein said connecting rod is pivotally attached between a first connecting point and a second connecting point on a drivetrain assembly.

9. The driveshaft recited in claim 8 wherein said first connecting point and said second connecting point on said drivetrain assembly have offset axes of rotation.

10. The driveshaft recited in claim 9 wherein each said male pivot has a convexly-curved pivot surface that pivotally engages with a concavely-curved pivot surface on said corresponding female pivot.

11. The driveshaft recited in claim 10 wherein said plurality of adjacent vertebrae includes at least three adjacent vertebrae pivotally arrayed along said connecting rod.

12. The driveshaft recited in claim 11 wherein said connecting rod is a cable.

13. A driveshaft for transferring torsional rotation comprising:
   (a) a plurality of adjacent vertebrae, each said adjacent vertebrae having first and second ends, a central vertebra through-bore, a counterbore around said central vertebra through-bore, and a plurality of male interlocks and corresponding female interlocks at said first and second ends of each said adjacent vertebrae, said adjacent vertebrae pivotally mated by said male interlocks and corresponding female interlocks;
   (b) a male pivot and a corresponding female pivot, said male pivot and said corresponding female pivot each having a pivot through-bore, wherein said male pivot and said corresponding female pivot are pivotally interposed between said adjacent vertebrae within each said counterbore around said central vertebra through-bore at said ends of said adjacent vertebrae;

(c) a connecting rod extending through said central vertebra through-bore of said adjacent vertebrae and through said pivot through-bore of said male pivot and said pivot through-bore of said female pivot;

(d) said male pivot and said corresponding female pivot pivotally retained within said counterbore at said ends of said adjacent vertebrae; and (f) each said male pivot having a flat surface at one end and a convexly-curved pivot surface at its opposite end, each said female pivot having a concavely-curved pivot surface at one end corresponding with said convexly-curved pivot surface of said male pivot and a flat surface at its opposite end.

14. The driveshaft recited in claim 13 wherein said connecting rod is pivotally connected between a first terminal vertebra and a second terminal vertebra.

15. The driveshaft recited in claim 14 wherein said first terminal vertebra and said second terminal vertebra are connected to connecting points on a drivetrain assembly having offset axes of rotation.

16. The driveshaft recited in claim 15 wherein said connecting rod extends through said central vertebra through-bore of at least three said adjacent vertebrae.

17. The driveshaft recited in claim 15 wherein said connecting rod is a cable.

* * * * *